United States Patent [19]
Hill et al.

[11] Patent Number: 5,388,765
[45] Date of Patent: Feb. 14, 1995

[54] GAS TURBINE NOZZLE CONSTRUCTION

[75] Inventors: James D. Hill; Claude R. Stogner; Anthony M. Zimmerman, all of Palm Beach Gardens, Fla.

[73] Assignee: United Technologies Corporation, Hartford, Conn.

[21] Appl. No.: 510,758

[22] Filed: Apr. 18, 1990

[51] Int. Cl.[6] .............................................. F02K 1/38
[52] U.S. Cl. ................................. 239/127.3; 60/266; 60/271; 239/265.17
[58] Field of Search ............ 239/127.1, 127.3, 265.17, 239/265.19, 265.33, 265.37; 60/266, 271, 757; 244/117 A

[56] References Cited

U.S. PATENT DOCUMENTS

| 3,793,827 | 2/1974 | Ekstedt ............................ 60/757 |
|---|---|---|
| 4,071,194 | 1/1978 | Eckert et al. ................... 239/127.3 |
| 4,093,157 | 6/1978 | Cavanagh, Jr. et al. ............ 244/53 |
| 4,109,459 | 8/1978 | Ekstedt et al. ...................... 60/757 |
| 4,747,543 | 5/1988 | Madden ............................. 239/127.3 |
| 4,887,663 | 12/1989 | Auxier et al. ......................... 165/47 |

*Primary Examiner*—David Brown
*Assistant Examiner*—Karen B. Merritt
*Attorney, Agent, or Firm*—Norman Friedland

[57] ABSTRACT

A planar top plate (32) has film cooling slots (34) therein. A rigid honeycomb structure (38) sealingly joins this top plate with bottom plate (36). Cooling air distributed by openings (50) impinges on the top plate and passes through metering openings (48) to the slots. A flat wall surface with reduced aerodynamic losses is maintained and the uniform support of the top plate avoids local distortion which would crack any heat resistant coating applied thereto.

6 Claims, 2 Drawing Sheets

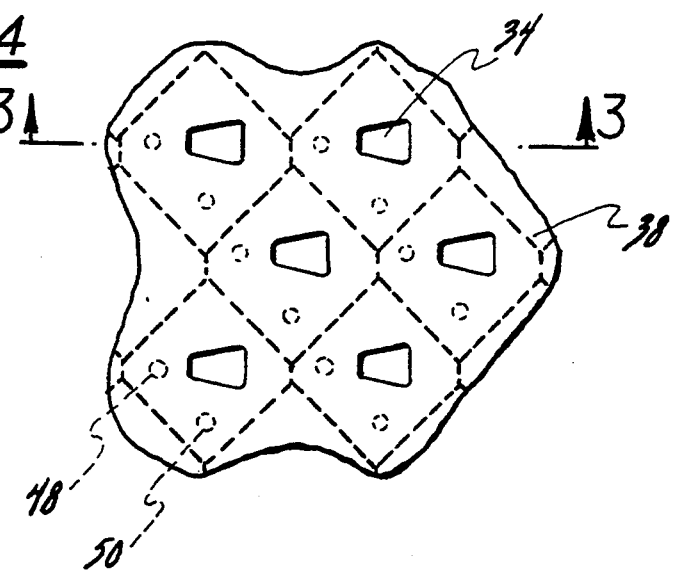
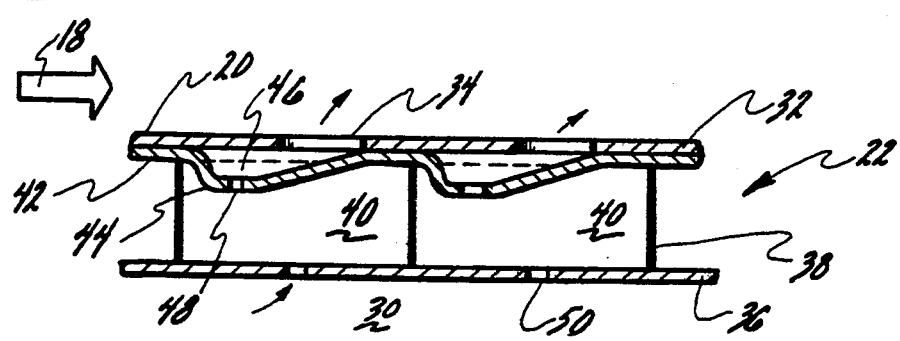
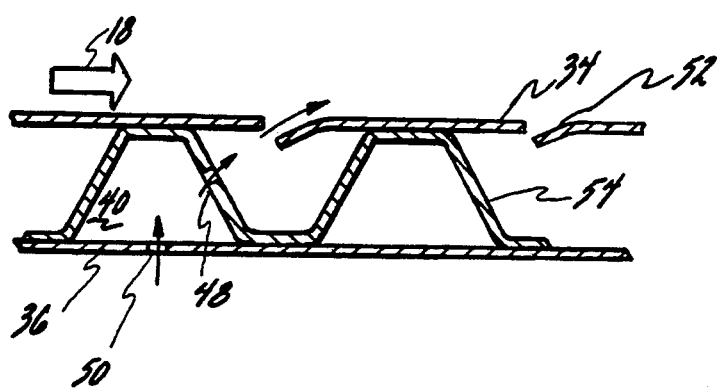
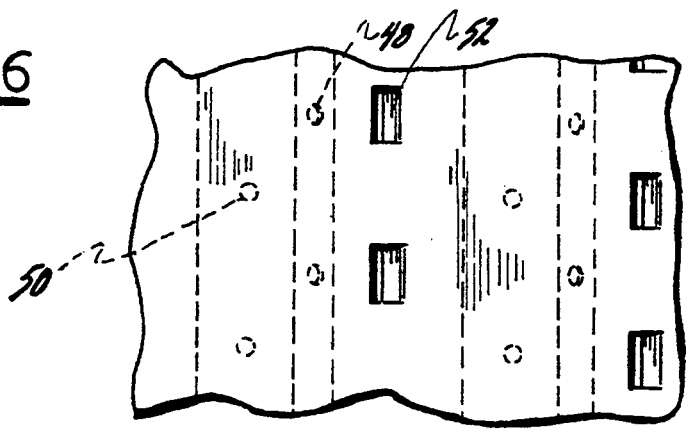

GAS TURBINE NOZZLE CONSTRUCTION

The Government has rights in this invention pursuant to a contract awarded by the Department of the Air Force.

TECHNICAL FIELD

The invention relates to nozzles of afterburning gas turbine engines and in particular to construction of the walls of a 2D nozzle.

BACKGROUND OF THE INVENTION

Gas turbine engines with afterburning produce hot gas in the order of 1,500° C. passing through the exhaust nozzle. Nozzle walls must therefore have sufficient strength to operate in the elevated temperature environment and must also have a reasonable life.

Nozzles therefore have been constructed with cooled underlying structure providing sufficient strength. Liners have been used to protect this underlying structure from the high temperature gas. Such liners are conventionally either catenaries of thin metal or layered louvers. While these have been cooled, provision must still be made for the thermal expansion. These previous constructions have therefore led to local bending in the high temperature environment since they were willfully left free to expand whereby these expansion could be accepted without high stresses.

Ceramic coatings may be applied to metals operating in hot environments to protect the metal surface. Such coatings are notoriously brittle. Local distortion of the liners would cause cracking and loss of the coating.

Louver and catenary construction provides walls which are not completely flat and therefore tend to cause aerodynamic losses. This is particularly so in the flaps of a 2D nozzle which must be moved to direct the gas flow.

SUMMARY OF THE INVENTION

The nozzle construction produces flat walls which are integral with the structural support. These are secured in a manner to avoid local bending and therefore the loss of any applied coating. The walls are also cooled in a uniform controlled manner.

The cooled nozzle wall includes a single planar top plate exposed to the hot gas, display having therein a plurality of slots to pass film cooling air. A parallel bottom sheet is remote from the hot gas with the structural frame connecting the two.

BRIEF DESCRIPTION OF THE DRAWINGS

FIG. 3 is a sectional view through the nozzle wall of a honeycomb construction;
FIG. 4 is a top view of the nozzle wall of a honeycomb construction;
FIG. 5 is a sectional view through the nozzle wall of a truss construction;
and
FIG. 6 is a top view of a nozzle wall with the truss construction.

DESCRIPTION OF THE PREFERRED EMBODIMENT

Figure 1:
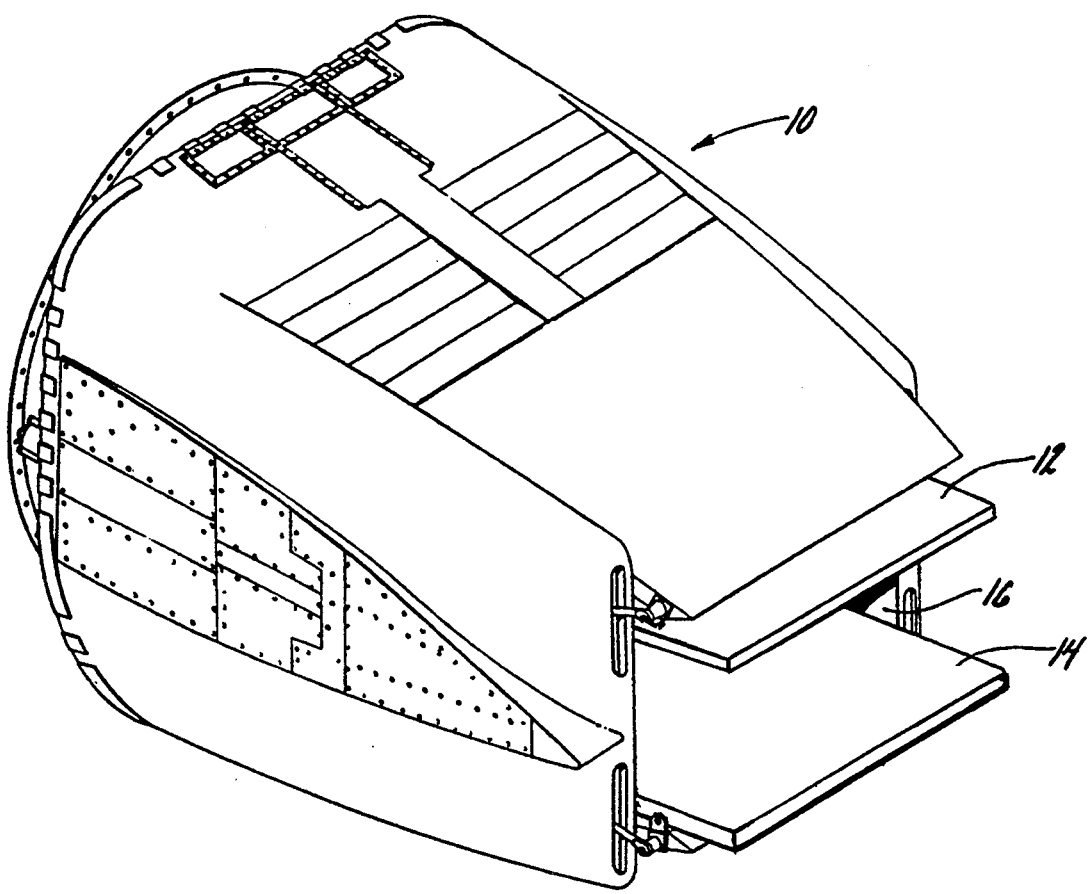
FIG. 1 is an isometric view of a nozzle.
Figure 2:
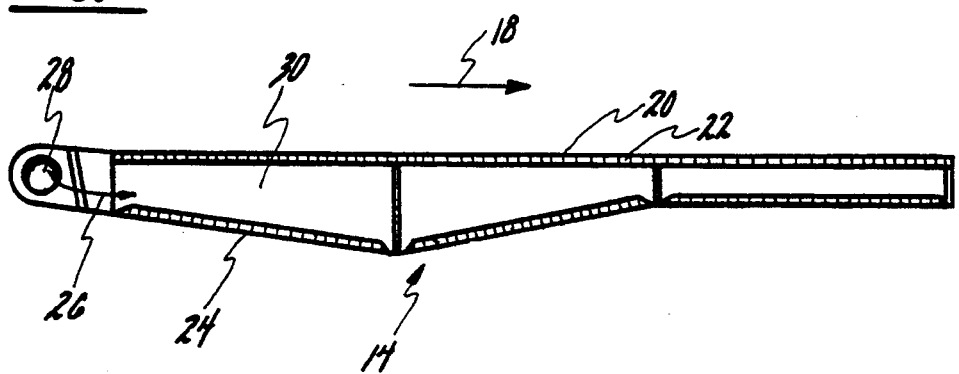
FIG. 2 is a side section through a nozzle flap.

FIG. 1 illustrates nozzle 10 with nozzle flaps 12 and 14 and side wall 16. Referring to FIG. 2, hot gas flow 18 passes along the flat surface 20 of nozzle wall 22. The overall structure is further supported by structural framework 24.

A flow of cooling air 26 passes through hinge 28 into the source volume 30.

FIG. 3 is a section through the nozzle wall 22. A top plate 32 has plurality of film cooling slots 34 therein. A parallel impingement plate 36 is spaced therefrom on the cool side.

The honeycomb structure has a plurality of chambers 40 which are both axially and transversely spaced and which when secured to the top and bottom plates form plenums.

The top sheet is preferably formed with a second underlying sheet 42 brazed thereto, but deformed in locations with deformations 44 forming cavities 46. Cooling air is available at an elevated pressure in source volume 30.

A metering hole 48 is located in the deformation 44 so that cooling air passing therethrough impinges against the top plate 32. The air then flows through slot 34 at an acute angle with the surface thereof so as to form a film cooling flow of air. Since the distribution and velocity of flows in all of these openings is to be substantially the same, these openings and slots are of the same size throughout the nozzle wall.

Impingement openings 50 are located in impingement plate 36. As seen in FIG. 4, these are located to impinge air upon the top plate at locations intermediate the air impingement locations from the openings 48 and intermediate slots 34. Since the actual local pressure may vary from place to place on the gas side of the nozzle as well as possibly within volume 30 some modification of the flow path may be made to maintain the earlier described uniform flow. It is these openings 50 which are selected of varying size to achieve the overall uniform flow distribution. It can be seen that at the honeycomb structure being secured to the top plate provides a relatively uniform bonding over the entire surface, this avoids the potential of high local bending at any one location that would crack any film or protective coating applied to the surface 20.

FIGS. 5 and 6 illustrate an alternate embodiment which is easier to fabricate, but which is not as uniformly secured to the top sheet. In flat plate 34 a plurality of film cooling openings 52 are formed by deforming a portion of the material down. The top plate 34 and the bottom plate 36 are brazed to a planar truss structure 54. Impingement opening 50 is sized for flow distribution passing air into the chamber or plenum 40. The metering hole 48 causes a flow to impinge upon the top sheet 34 and then flow through opening 52.

A flat plate adjacent the gas is maintained facilitating the flow of hot gas therethrough with a minimum of turbulence. A substantially uniform support of the top plate is obtained while provisions for cooling this top plate are also provided.

We claim:

1. A cooled nozzle wall for a 2D gas type turbine engine discharge nozzle comprising:
    a single planar top sheet exposed to the hot gas;
    a parallel bottom sheet remote from the hot gas;
    a structural frame having a plurality of axially spaced chambers, rigidly and sealingly secured to each of said sheets;
    whereby a plurality of discrete plenums is formed;
    a plurality of impingement openings through said bottom sheet, one into each of said plenums;

a plurality of secondary cavities arranged with the top sheet forming one wall of said cavity and having a separation wall separating said cavity from said plenum;

a metering opening through each separation wall;

a film slot through said top sheet in fluid communication with each cavity; and air supply means for supplying cooling air to said impingement opening from a common source.

2. A cooled nozzle wall as in claim 1:

each metering opening and film slot of substantially the same size; and said impingement openings of different sizes in accordance with expected pressure distribution of hot gas and coolant.

3. A cooled nozzle wall as in claim 1:

each metering opening located to direct air flow therethrough against the top sheet.

4. A cooled nozzle wall as in claim 1:

said structural frame being a honeycomb structure.

5. A cooled nozzle as in claim 4:

said top sheet having an under sheet forming a portion thereof and secured thereto; and said cavity formed between said top sheet and said under sheet.

6. A cooled nozzle wall as in claim 1:

said structural frame formed of a plate truss;

the space between said truss and said bottom sheet defining said chambers; and the space between said truss and said top sheet defining said cavities.

* * * * *